United States Patent [19]

Williams et al.

[11] Patent Number: 4,517,101

[45] Date of Patent: May 14, 1985

[54] REDUCED BIODEGRADABILITY IN A POLYMER FLOOD PROCESS

[76] Inventors: David Williams, 2708 S. Elder St.; Douglas M. Munnecke, 2712 S. Elder St., both of Broken Arrow, Okla. 74012

[21] Appl. No.: 525,532

[22] Filed: Aug. 22, 1983

[51] Int. Cl.³ .............................................. E21B 43/22
[52] U.S. Cl. ............................... 252/8.55 D; 166/246; 435/104; 435/910; 536/114
[58] Field of Search .................. 252/8.55 D; 166/246; 435/104, 910; 536/114

[56] References Cited

U.S. PATENT DOCUMENTS

| | | | |
|---|---|---|---|
| 4,256,590 | 3/1981 | Naslund et al. | 252/8.55 D |
| 4,340,678 | 7/1982 | Wernau | 252/8.55 D |
| 4,352,741 | 10/1982 | Wernau | 252/8.55 D |

Primary Examiner—Leland A. Sebastian
Attorney, Agent, or Firm—George L. Rushton

[57] ABSTRACT

In a polymer flood, where bacterial contamination frequently causes a loss in viscosity of the polymer, the viscosity of the polymer solution is maintained by the use of a xanthan polymer modified by methylation of a portion of the subunit sugar residues of the xanthan base.

5 Claims, 9 Drawing Figures

Repeating subunit sugar residues of xanthan gum.

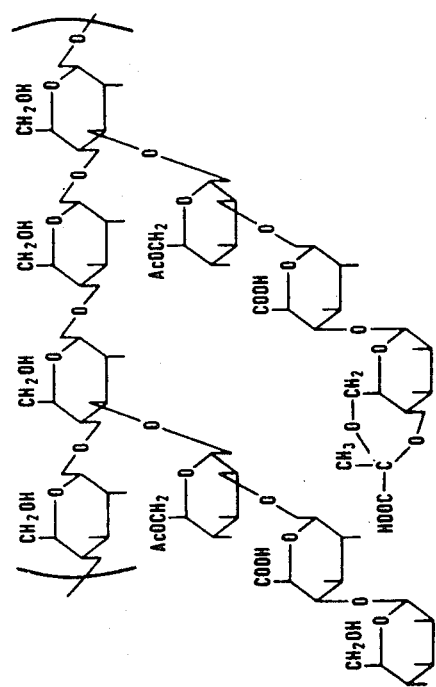
Figure 1. Repeating subunit sugar residues of xanthan gum.

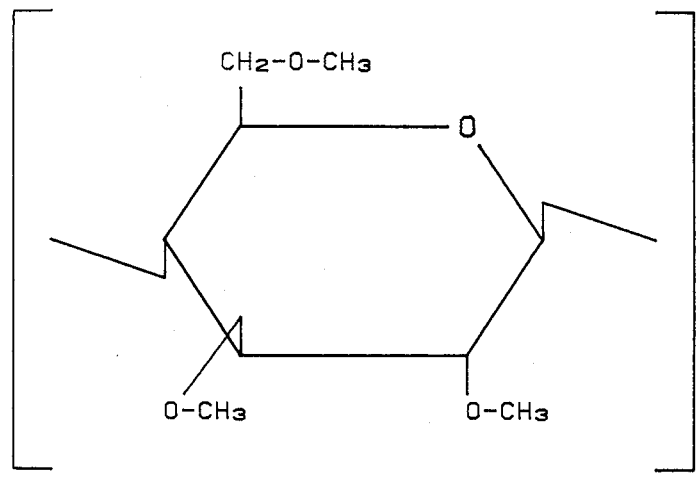
FIG. 2 METHYLATED SUGAR RESIDUE OF XANTHAN GUM.
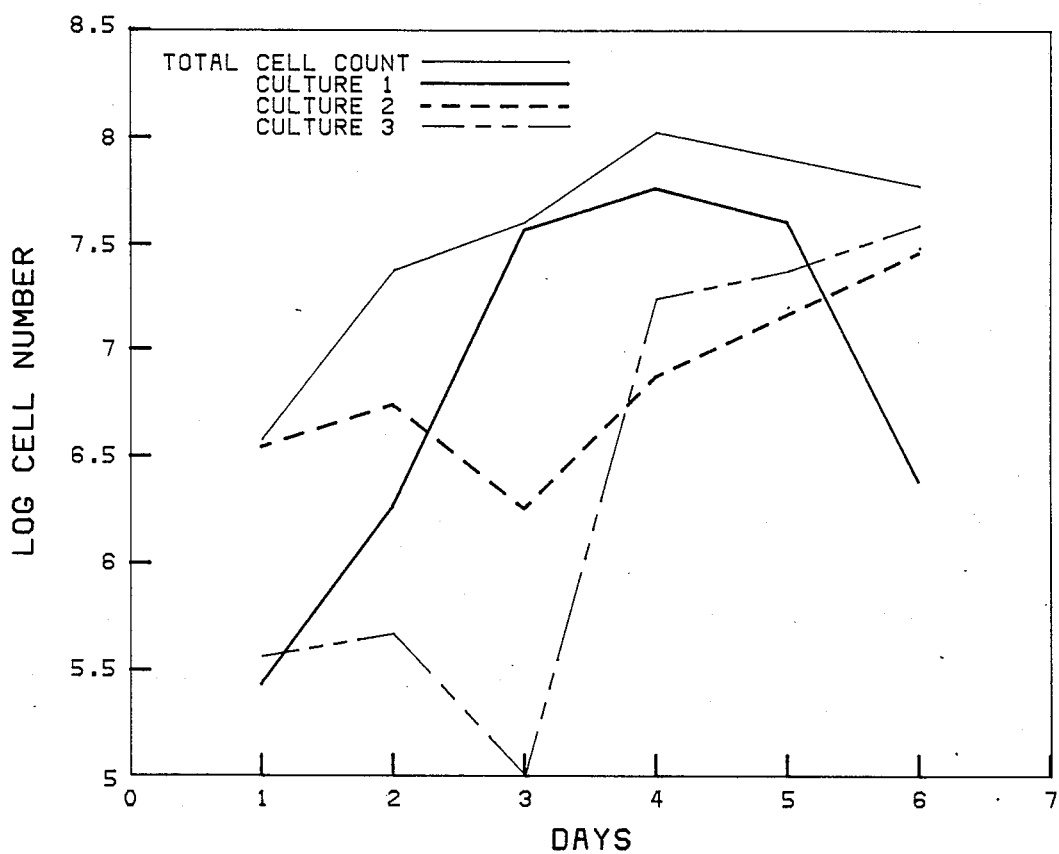
FIG. 3 CELL COUNTS OF CULTURES, GROWING ON 1000 PPM XANTHAN, WHICH WERE ORIGINALLY ISOLATED FROM SOIL.

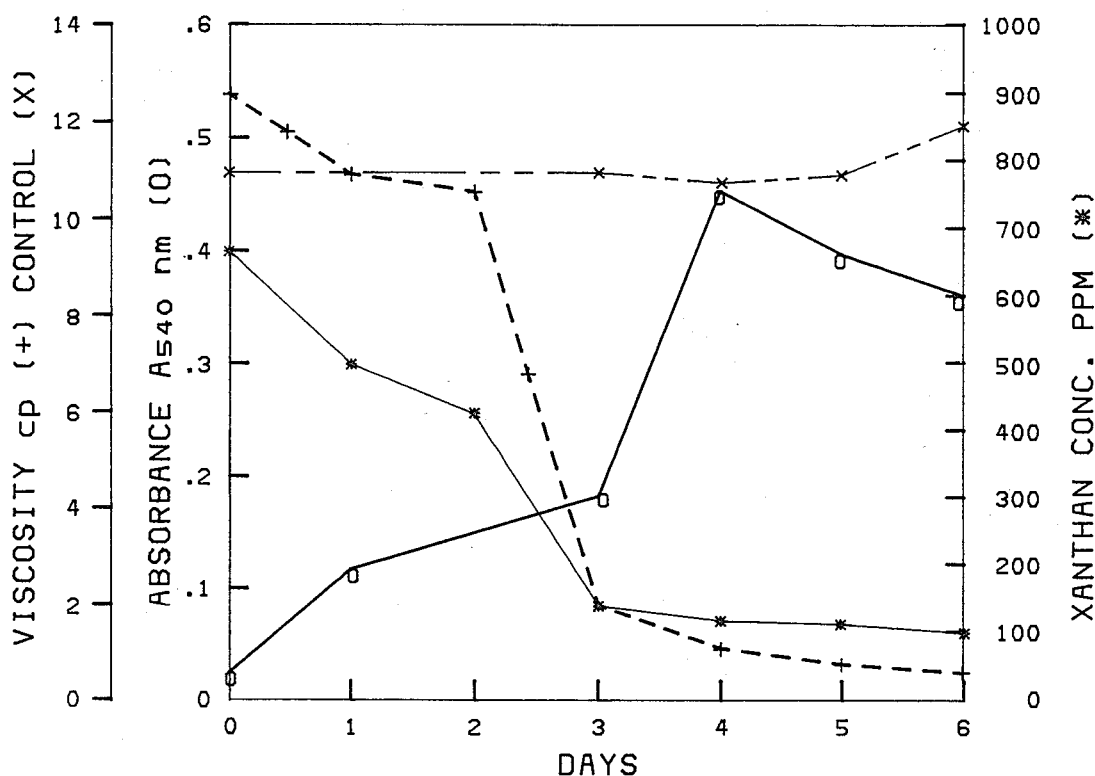
FIG. 4  VISCOSITY, XANTHAN CONCENTRATION, AND ABSORBANCE MEASUREMENTS OF XANTHAN BROTH INOCULATED WITH A SOIL MIXED CULTURE.
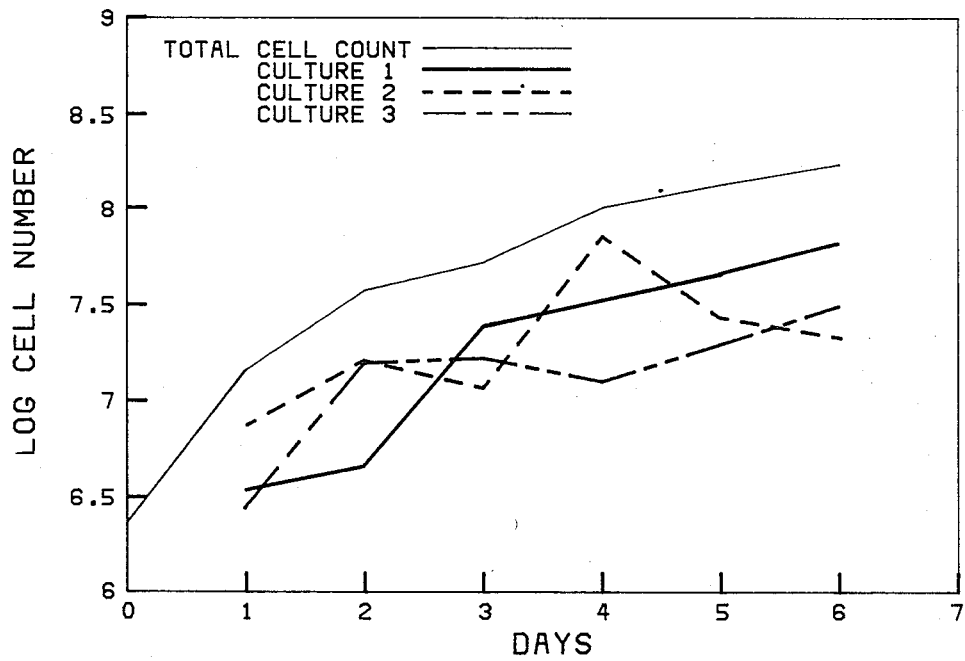
FIG. 5  CELL COUNTS OF CULTURES, GROWING ON 1000 PPM XANTHAN, WHICH WERE ORIGINALLY ISOLATED FROM SEWAGE.

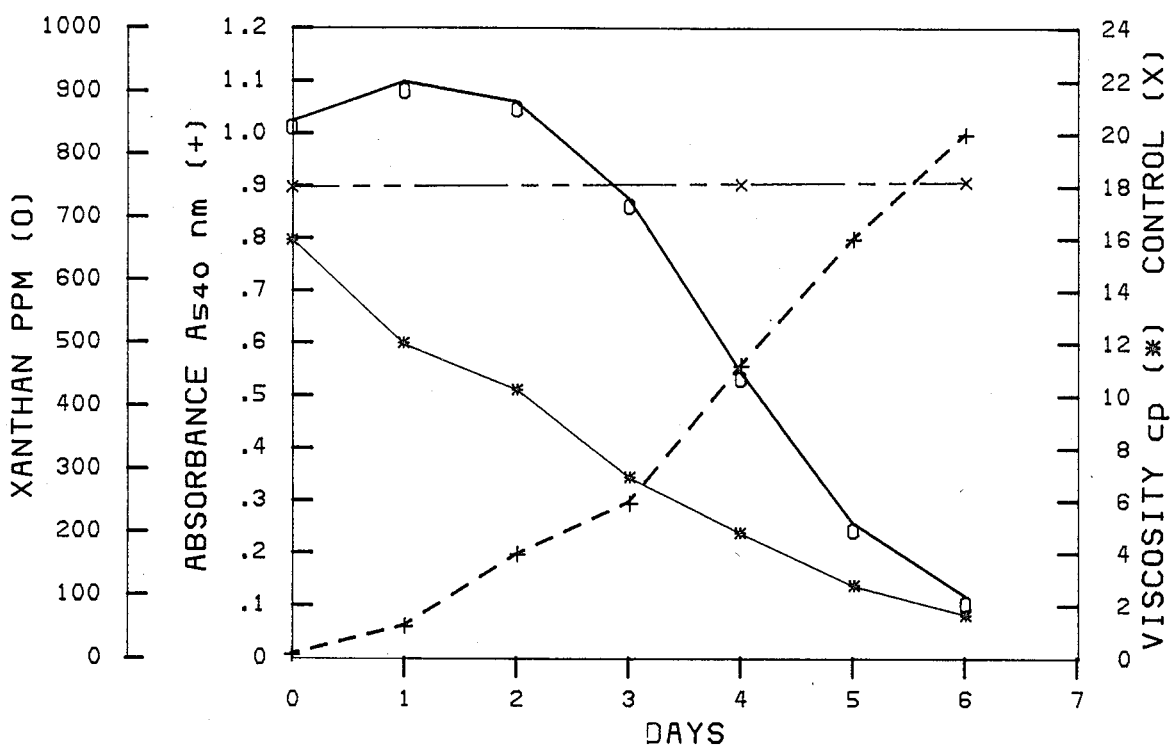
FIG. 6  VISCOSITY, XANTHAN CONCENTRATION, AND ABSORBANCE MEASUREMENTS OF XANTHAN BROTH INOCULATED WITH A SEWAGE MIXED CULTURE.
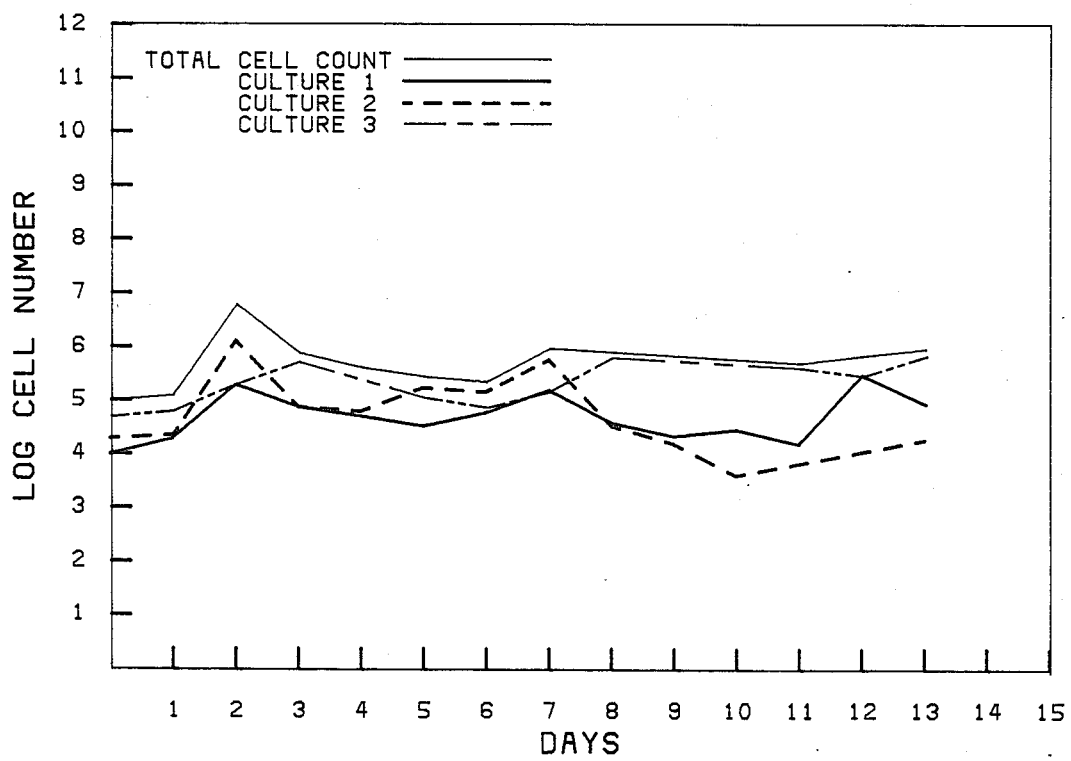
FIG. 7  CELL COUNTS OF CULTURES INOCULATED INTO METHYLATED XANTHAN.

FIG. 8 VISCOSITY OF INOCULATED METHYLATED XANTHAN AND UNINOCULATED NORMAL XANTHAN CONTROL.

FIG. 9 METHYLATED XANTHAN AND NORMAL XANTHAN + ENZYME EXTRACT, AND NORMAL XANTHAN WITH HEAT INACTIVATED ENZYME EXTRACT.

REDUCED BIODEGRADABILITY IN A POLYMER FLOOD PROCESS

BACKGROUND OF THE INVENTION

This invention concerns enhanced oil recovery processes involving a polymer flood. More particularly, the invention concerns a recovery involving a xanthan polymer flood. More particularly, the invention concerns a polymer floor recovery process wherein the biodegradation of the xanthan polymer is suppressed by the use of a chemically modified xanthan gum polymer.

The commercially available biopolymer xanthan, or xanthan gum, has been used in enhanced oil recovery processes as a polymer flood, and this procedure is well known in the art. A major problem concerning the use of of xanthan is that various microbes found in reservoirs have the ability to metabolize xanthan before its usefulness is completed. A prior art method of combatting this microbial attack is by the injection of a biocide into the reservoir formation. However, the use of a biocide leads to worker exposure to potentially harmful compounds. Further, the cost of the biocide adds to the general expense of the enhanced oil recovery process.

Accordingly, there exists an urgent need for a means to suppress or reduce the biodegradation of xanthan in a polymer flood process.

SUMMARY OF THE INVENTION

We have overcome or avoided the difficulties and disadvantages of prior art methods to reduce the biodegradation of xanthan by the use of a methylated xanthan gum in the polymer flood. Further, in such an enhanced oil recovery process, we have a method for modifying the xanthan polymers to make them more resistant to degradation by methylating a xanthan gum solution and recovering the methylated polymer.

BRIEF DESCRIPTION OF THE DRAWINGS

FIG. 1 illustrates the repeating sub-unit sugar residues of xanthan gum.

FIG. 2 represents a methylated sugar residue of xanthan gum.

FIG. 3 shows the cell count of soil cultures, grown on 1,000 ppm xanthan.

FIG. 4 shows the viscosity, xanthan concentration, and cell absorbance measurements of xanthan broth inoculated with a soil mixed culture.

FIG. 5 shows the cell counts of sewage cultures, grown on 1,000 ppm xanthan.

FIG. 6 shows the viscosity, xanthan concentration, and cell absorbance measurements of xanthan broth inoculated with a sewage mixed culture.

FIG. 7 shows the cell counts of cultures inoculated into methylated xanthan.

FIG. 8 shows the viscosity of inoculated methylated xanthan and of uninoculated normal xanthan control.

FIG. 9 shows the viscosity measurements of methylated xanthan, normal xanthan treated with enzyme extract, and normal xanthan treated with heat-inactivated enzyme extract.

DETAILED DESCRIPTION OF THE EMBODIMENTS

One accepted structure of xanthan gum, as illustrated in FIG. 1, shows a linear cellulosic backbone of $\beta$-(1-4)-linked D-glucose residues with side chains consisting of $\alpha$-(1-3)-linked D-mannose, $\beta$-(1-4)-linked D-glucuronic acid, and $\beta$-(1-4)-linked D-mannose residues bound to alternating D-glucose residues on the backbone. The D-mannose units nearest the backbone have O-acetyl groups linked at the C-6 position. The terminal D-mannose residues may have a pyruvic acetal unit linked to them, but their occurrence can vary depending on the culture strain and environmental conditions experienced during production.

The biopolymer xanthan, or xanthan gum, is a commercially available product formed from the fermentation of hexose sugars. For example, it can be obtained from the Kelco division of Merck as "Xanflood", a flowable powder, and from Pfizer as "Flocon", a viscous liquid containing about 2% of formaldehyde preservative. In utilizing the xanthan polymer in a polymer flood, the gum is mixed with water to a nominal concentration, with the final concentration preferably being determined by viscosity measurements. Since a principal physical characteristic of the polymer floor concerns the viscosity of the polymer solution or mixture used, changes in viscosity are monitored during the progress of an enhanced oil recovery process. It is known that various microbes can attack and degrade the xanthan gum, with a resultant loss or reduction of viscosity. Thus, chemical modification of the xanthan gum to produce a material that is resistant to microbial degradation can result in a material that has a longer and more useful life as a polymer flood material in enhanced oil recovery.

As shown in FIG. 2, methylation of some of the available hydroxyl groups results in a methylated sugar residue. This methylated material resists the biodegradation from microbial attack.

Other biopolymers also have available hydroxyl groups which can be methylated. Examples of other biopolymers are scleroglucan, from the fermentation of a starch or sugar base, such as molasses, by Sclerotium, and guar gum, a natural polysaccharide. Other ethers, such as ethyl ethers or propyl ethers, can be made from typical biopolymers.

Based on a procedure from Vogel's "Textbook of Practical Organic Chemistry", a commercial xanthan gum ("Xanflood" from Kelco) was prepared as an aqueous solution having a concentration of one gram per liter of water (1,000 ppm). To this xanthan solution, cooled in an ice bath, was added one gram of sodium hydroxide flake, followed by three grams of dimethyl sulfate. The resultant mixture was stirred for one hour and then gently heated to reflux temperature for two hours. Polymer was precipitated from the resultant mixture by the addition of about 50% V/V isopropyl alcohol. The filtered precipitate was washed with isopropyl alcohol, followed by acetone. The precipitate was then dried at 60° C. IR spectrophotometric analysis showed an increase of ether linkages, which supports the idea of methyl ether formation.

The concentration of the aqueous xanthan gum solution can vary from about 0.5 to about 3 g/l. The reaction temperature of the mixture varies from about 5° to about 25° C. The methylating agent, such as dimethyl sulfate, can be added to the gum solution at a rate of about 2 to 4 g per g of xanthan polymer, over a period of about 5 minutes/l of polymer solution.

The methylation of the hydroxyl groups of xanthan is based on the stoichiometry of the reaction, so that the amounts can be properly adjusted for reactions to give greater weights of products. The sodium hydroxide is added to furnish a pH of about 11, such as from 10 to 12, while the time periods for stirring and reflux can be adjusted, depending on the methylation yield desired. It is to be noted that the viscosity of a particular concentration of the methylated xanthan gum is an important physical property.

Cultures of microorganisms were obtained from two different sources. One mixed culture inoculum was obtained from soil collected from a pasture near Tulsa, Okla., and the other mixed culture was obtained from sewage collected from a Tulsa sewage treatment facility. Cultures were maintained on a typical basal salts medium supplemented with sugars or xanthan gum as the sole carbon source. Glucose, mannose, glucuronic acid, and xanthan gum were added, depending on experimental requirements. The sugar concentrations were generally 0.5% weight, and the xanthan gum concentration was 1 g/l. The culture media were filter sterilized prior to inoculation.

Cell counts were determined by the spread plate technique, using serial dilutions of the test culture on glucose-mannose-xanthan basal salts agar plates, or by direct count, using a Petroff-Hauser counting chamber. Xanthan concentrations were determined by HPLC (High Performance Liquid Chromatography), using a Waters E500 column, 0.02% sodium azide mobile phase, and a RI detector, and by a phenol-sulfuric acid colorimetric assay. Cell turbidity was determined on a Bausch and Lomb Spec 70 spectrophotometer at 540 nm. Viscosity was measured with a digital Brookfield cone and plate viscometer, using a shear rate of 22.5 $sec^{-1}$ at 3 rpm. Infrared analysis of the polymer was performed using a Perkin-Elmer IR spectrophotometer.

Enzyme purification was performed to show that xanthan degradation was due to enzymes, rather than through chemical reaction. To do this, a 3,000 ppm xanthan solution, which had been degraded by one of the mixed bacterial cultures previously mentioned was centrifuged at 10,000 g to remove cells and other particulate matter, and the supernatant was mixed with ammonium sulfate to produce a solution which was 70% saturated with ammonium sulfate. At this salt concentration, any proteins (enzymes) in the broth were precipitated and were collected by centrifugation. The resulting protein pellet was resuspended in 5 ml of buffered basal salts.

The mechanism of xanthan polymer degradation is not fully understood. Some evidence indicates that one single organism is not responsible for xanthan degradation, but that several organisms in a synergistic relationship are necessary. There may be several different enzyme components described as a "xanthanase enzyme" which are responsible for complete degradation of xanthan polymer. Thus, several organisms may each produce a different enzyme which will hydrolyze a bond at a specific site on the polymer molecule, resulting in a sequential breakdown of the molecule by the mixed microbial culture.

FIG. 3 illustrates the number and type of viable cells present during polymer degradation for a period of six days, using the mixed culture isolated from soil. FIG. 5 offers similar information based on the mixed culture isolated from a sewage sample. In each case, the total cell count curve is representative of the mixed culture during sequential non-exponential phase of growth in a 1,000 ppm xanthan broth. As is frequently noted in mixed cultures, culture 1 rapidly increased in cell mass and then declined during the latter phase of degradation. As culture 1 approached maximum cell mass, culture 3 began a rapid increase in cells, followed by culture 2. In FIG. 4, the viscosities of inoculated and uninoculated control xanthan gum (1,000 ppm) broths were compared. Note that the viscosity of the uninoculated control remained fairly stable at about 11 cp. In contrast, the viscosity of the inoculated xanthan broth decreased from about 13 to approximately 1 cp during the six-day interval. The other curves in the Figure show the relationship between the increase in cell turbidity, as noted by the increase in absorbance, and the decrease in the xanthan concentration. FIG. 6 shows similar results when the xanthan broth was inoculated with a sewage mixed culture. Here again, the vicosity decreased as the xanthan concentration decreased, while the cell turbidity, reflecting the increase in the microorganism count, increased.

The three microorganism cultures isolated from the mixed sewage cultures were inoculated as pure cultures into glucose, mannose, and glucuronic acid broths, to assay for growth on the monosaccharides subunits of the xanthan molecule, with the results shown below:

| Culture | Glucose | Mannose | Glucuronic Acid |
| --- | --- | --- | --- |
| 1 | + | + | + |
| 2 | + | + | + |
| 3 | + | + | + |

All three cultures demonstrate the ability to utilize glucose, mannose, and glucuronic acid as sole carbon sources. As a preliminary classification, Culture 1 is a G+ facultative rod, and Cultures 2 and 3 are G− aerobic rods.

The above experimental data in the Figures and in the above table, describing the microbial degradation of xanthan gum, demonstrate the problem of rapid degradation of xanthan when used in an enhanced oil recovery process. Normally, biocides such as formaldehyde or glutaraldehyde are formulated with xanthan gum as a protectant against biodegradation. However, this protective measure is an added cost in polymer formulation, increases handling and mixing equipment costs, and produces a potentially hazardous working environment for workers exposed to biocidal chemicals. One alternative to biocide co-injection is to modify chemically the xanthan molecule to produce a biopolymer which maintains solubility and rheological characteristics of the natural biopolymer but is resistant to microbial degradation. We have found that the methylation of the hydroxyl groups on the sugar residues, to produce methyl ethers, offers a simple and useful alternative to the addition of biocides. Treatment of an alkaline xanthan gum solution with dimethyl sulfate, or other standard methylating agents, results in the methylation of portions of the biopolymer. Infrared spectrophotometric analysis of the methylated polymer showed an increase in absorbance at a frequency of 1250 $cm^{-1}$, as compared to the non-methylated polymer. This change in absorbance is consistent with an increase in ether linkages. One theory concerning this chemical modification is that changing the structural characteristics of the sugar residues without changing the polymer properties could cause enough of a conformational change of the polymer molecule, or a change in the site of enzymatic activity on the molecule, so as to inhibit enzyme recognition and subsequent hydrolysis.

FIGS. 7 and 8 show the results of inoculating a 1,000 ppm methylated xanthan broth with a mixed culture of the previously-described xanthan degrading organisms. The cell counts of FIG. 7 show a relative stability during the assay period, as contrasted to the previous figures. FIG. 8 shows that the viscosities of inoculated methylated xanthan broth and uninoculated normal xanthan control were similar and relatively stable, indicating no or slight degradation by the microorganisms.

FIG. 9 shows the action of enzyme extracts on xanthan broths, with the viscosity curves showing degradation, if any, by the enzymes on the substrate. Enzyme extracts were prepared as previously noted, and portions of the active enzyme extract were added to methylated and to non-methylated xanthan broths. A third enzyme extract, deactivated by heating, was added to a non-methylated xanthan broth. As shown in the Figure, no appreciable viscosity changes were noted for the mixtures of methylated xanthan or xanthan having the heat-inactivated enzyme extract, thus indicating little or no degradation of the xanthan by enzymatic or chemical processes. The third curve, showing a marked decrease in viscosity, is comparable to the curves of FIGS. 4 and 6, wherein the xanthan was degraded by the mixed cultures and shows the susceptibility of conventional xanthan to enzymatic degradation.

There were no toxic effects from any dimethyl sulfate which may have been carried over into the xanthan gum medium. Experiments using combinations of glucose, normal xanthan gum, and methylated xanthan gum showed organisms could grow freely in the presence of methylated xanthan gum. A solution of 50% normal xanthan gum and 50% methylated xanthan gum showed only a 50% reduction in viscosity when inoculated with xanthan degrading cultures; thus, only the normal xanthan was degraded and no toxic effects were caused by the methylated xanthan gum.

Methylated xanthan biopolymer resists attack by microorganisms, and thus the degradation of a methylated xanthan biopolymer used in an enhanced oil recovery process is suppressed.

EXAMPLE

In the operation of a producing reservoir, partially depleted and operating under tertiary recovery methods, four 5-spot patterns were located on about 200 acres. Nine injection wells in this area were pre-flushed with fresh water, and a micellar solution of sodium alkyl aryl sulfonates was injected. Next, xanthan gum (Abbott Labs) was injected as an aqueous concentration of about 1200 ppm.

The average porosity of the field was 0.23, and the average permeability was about 172 md. In a 10-month period, approximately 350,000 bbl. of the polymer solution were injected. Samples of the injected material were taken from observation wells located between the injection well and related production wells.

About 10 months after the start of the polymer injection, observation samples showed a sharp decline in viscosity, from about 38 centipoise (cp) to about 2 cp. Microbiological testing showed that the observation samples were severely contaminated by bacteria, using the known and accepted API RP-38 test. The loss of viscosity and the high bacterial count strongly suggested degradation of the xanthan polymer by microorganisms.

Secondary butyl alcohol (2 wt. % SBA based on the injection rate of polymer solution during the biocide injection) and isobutyl alcohol (1.2 wt. % IBA) were used to control bacterial growth. As the alcohols were injected, the bacterial cell counts steadily and significantly diminished, and the viscosity of the observed fluid increased from about 2 cp to about 25 cp, over a term of about eight months.

In a field similar to that described above, a similar water pre-flush is made, followed by a micellar injection. Then, a methylated xanthan gum, made by the previously described procedure, is injected at a concentration of about 1200 ppm, over a period similar to that above. The concentration of the injected methylated xanthan gum can vary from about 500 to about 2000 ppm.

About 10 months after the start of the polymer injection, observation samples show a negligible change in viscosity of the polymer solution, probably in the range of experimental error, and no appreciable change in bacterial count from the normal population. The rheological properties of the polymer flood are thus maintained.

The above observations indicate that the use of a methylated polymer, such as methylated xanthan gum, can overcome or minimize the problems in tertiary recovery caused by microbial degradation of the polymer. The use of methylated xanthans can obviate the use of expensive or toxic biocides in tertiary recovery.

We claim:

1. In an enhanced oil recovery process, a method for modifying xanthan gum polymers to make them more resistant to bacterial enzymatic degradation, comprising
   (a) methylating a xanthan gum polymer in an aqueous solution, and
   (b) recovering the methylated polymer.

2. A process of enhanced oil recovery of a micellar polymer flood type wherein the biodegradability of the polymer is suppressed by the use of a methylated xanthan gum in the polymer flood.

3. The method of claim 1, wherein
   (a) the xanthan gum polymer is in the form of an aqueous solution with a polymer concentration of from about 0.5 to about 3 grams per liter,
   (b) the xanthan gum polymer solution temperature is from about 5° C. to about 25° C.,
   (c) the pH of the xanthan gum polymer solution is maintained at a value of from about 10 to about 12,
   (d) a methylating agent is added to the xanthan gum polymer solution in amounts of from about 2 to about 4 g/g polymer, over a period of 5 minutes per liter of polymer solution, and
   (e) the methylated xanthan gum polymer is precipitated from solution and separated.

4. The method of claim 3, wherein
   (a) the methylating agent is dimethyl sulfate, and
   (b) the precipitating agent is isopropyl alcohol.

5. The process of claim 2, wherein
   (a) the methylated xanthan gum polymer is injected into the formation, in the form of an aqueous solution, at a concentration of from about 500 to about 2000 ppm., and
   (b) at least a portion of the available hydroxyl groups of the xanthan gum polymer are methylated.

* * * * *